(12) United States Patent
Lee et al.

(10) Patent No.: US 6,611,303 B1
(45) Date of Patent: Aug. 26, 2003

(54) BACKLIGHT DEVICE FOR A LIQUID CRYSTAL DISPLAY DEVICE

(75) Inventors: Jonghoon Lee, Seoul (KR); Chul Park, Kyonggi-do (KR); Seehyung Lee, Kyonggi-do (KR)

(73) Assignee: LG. Philips LCD Co., LTD, Seoul (KR)

( * ) Notice: Subject to any disclaimer, the term of this patent is extended or adjusted under 35 U.S.C. 154(b) by 0 days.

(21) Appl. No.: 09/588,692

(22) Filed: Jun. 7, 2000

(30) Foreign Application Priority Data

Jun. 7, 1999 (KR) .................................. 1999-20991

(51) Int. Cl.[7] .......................................... G02F 1/1335
(52) U.S. Cl. .......................................... 349/65; 349/64
(58) Field of Search .............................. 349/61, 64, 65, 349/63; 385/146; 362/31, 330, 331

(56) References Cited

U.S. PATENT DOCUMENTS

| 586,247 | A | * | 7/1897 | Soper | |
|---|---|---|---|---|---|
| 720,386 | A | * | 2/1903 | Wadsworth | |
| 720,987 | A | * | 2/1903 | Wasworth | |
| 5,418,631 | A | * | 5/1995 | Tedesco | 359/15 |
| 5,961,198 | A | * | 10/1999 | Hira et al. | 362/31 |
| 6,011,601 | A | * | 1/2000 | Kojima | 349/62 |
| 6,011,602 | A | * | 1/2000 | Miyashita et al. | 349/65 |
| 6,023,316 | A | * | 2/2000 | Yano | 349/112 |
| 6,079,841 | A | * | 6/2000 | Suzuki | 362/31 |
| 6,104,455 | A | * | 8/2000 | Kashima | 349/65 |
| 6,130,730 | A | * | 10/2000 | Jannson et al. | 349/65 |
| 6,196,691 | B1 | * | 3/2001 | Ochiai | 362/31 |
| 6,215,936 | B1 | * | 4/2001 | Yoshikawa et al. | 385/133 |
| 6,356,391 | B1 | * | 3/2002 | Gardiner et al. | 359/628 |

FOREIGN PATENT DOCUMENTS

| JP | 6118246 | 4/1994 |
|---|---|---|
| JP | 06331981 | 12/1994 |

OTHER PUBLICATIONS

English language Abstract of JP 6–118246.

* cited by examiner

*Primary Examiner*—Robert H. Kim
*Assistant Examiner*—Dung Nguyen
(74) *Attorney, Agent, or Firm*—Birch, Stewart, Kolasch & Birch, LLP

(57) ABSTRACT

The present invention discloses a backlight device for a liquid crystal display device, which includes a light source; a light waveguide plate having an end portion and a front portion; a lamp holder having a lamp reflector, the lamp holder surrounding most part of the light source, the lamp reflector reflecting a light to the end portion of the light waveguide plate; and a first prism sheet located on the front portion of the light waveguide plate, the prism sheet having a plurality of convex portions, the convex portions having an inclined line portion and a curved line portion, the inclined line portion having an predetermined angle with respect to a direction vertical to the front portion of the light waveguide plate.

16 Claims, 4 Drawing Sheets

BACKLIGHT DEVICE FOR A LIQUID CRYSTAL DISPLAY DEVICE

CROSS REFERENCE

This application claims the benefit of Korean Patent Application No. 1999-20991, filed on Jun. 7, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a backlight device for use in the LCD device.

2. Description of Related Art

FIG. 1 shows a conventional backlight device for use in a LCD device. As shown in FIG. 1, the conventional backlight device 1 comprises a light source 10, a U-shaped lamp holder having a lamp reflector 16, and a light waveguide plate 40. The light source 10 is located adjacent to an end 40a of the light waveguide plate 40, and most of the light source 10 is surrounded by the lamp holder 15. The end 40a constitutes a surface through which the incident light from the light source 10 is emitted.

The emitted light from the light source 10 is directed toward the surface 40a of the light waveguide plate 40 by the lamp reflector 16. The light waveguide plate 40 directs light either toward a prism sheet 20 or a reflector 50. The light reflected by the reflector 50 is emitted toward the observer through a prism sheet 20, a diffusing sheet 30 and a liquid crystal panel (not shown) in the form of an information.

The aforementioned backlight device is disclosed in the prior art, for example, the Japanese Patent Publication of Application No. 6-118246. The prior art prism sheet 20 has a plurality of convex portions 33 for collecting the light emitted from the light waveguide plate 40. The convex portions 33 of the prism sheet 20 can have a fan shape (FIG. 1), a regular triangle shape (FIG. 2a), an isosceles triangle shape (FIG. 2b), or a half-circle shape (FIG. 2c). Therefore, the prism sheet 20 having a plurality of the convex portions 33 collects the light emitted from the light waveguide plate 40 not to be scattered so that the regularly directional light is emitted toward the diffusing sheet 30.

However, even though the prism sheet 20 having a plurality of the convex portions 33 is arranged, light loss may occur. For example, as shown in FIG. 2a, part of the emitted light from the light waveguide plate 40 is total-reflected only to be directed downwardly, and then the light reflected on the reflector 50 again is directed upwardly, having a large refraction angle with respect to the vertical direction.

Further, if the prism sheet is used together with a cholesteric liquid crystal; (CLC) polarizer, the color change property and light efficiency may decrease. In general, a directional vector of a CLC layer has a helical structure. When a right-handed circularly polarized lightis incident to the CLC layer having a-left-handed helical structure, the CLC layer reflects only a light having a wavelength that satisfies a Bragg reflection condition. Using such a principle, the CLC polarizer can use even light lost in an absorbing type polarizer, thereby remarkably improving light efficiency. In the same way, when a CLC color filter is used, the light efficiency is much improved.

However, when an incident angle of the circularly polarized light is greater than 20 degrees, the transmitted light is produced in the form of not circularly polarized light, but eliptically polarized light. Besides, a wavelength of the transmitted light is different from that of the incident light, thereby lessening the color change property and the light efficiency.

SUMMARY OF THE INVENTION

An object of the present invention is to provide a backlight device for a liquid crystal display device such that the light collecting efficiency and light illumination are much improved.

In order to achieve the above object, the present invention provides a backlight device for a liquid crystal display device, which includes a light source; a light waveguide plate having an end portion and a front portion; a lamp holder having a lamp reflector, the lamp holder surrounding most part of the light source, the lamp reflector reflecting light to the end portion of the light waveguide plate; and a first prism sheet located on the front portion of the light waveguide plate, the prism sheet having a plurality of convex portions, the convex portions having an inclined line portion and a curved line portion, the inclined line portion having a predetermined angle with respect to a direction vertical to the front portion of the light waveguide plate.

The angle of the inclined line portion is less than 20°. The light waveguide plate has a plurality of convex or concave hole dots. The light waveguide plate has a plurality of V-shaped convex or concave bars.

The backlight device further includes a reflector, arranged under the light waveguide plate and a diffusing sheet, interposed between the light waveguide plate and the first prism sheet; a second prism sheet having a plurality of convex portions, the second prism sheet arranged on the first prism sheet; a cholesteric liquid crystal polarizer arranged on the second prism sheet; and a quarter wave plate arranged on the cholesteric liquid crystal polarizer.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, examples of which are illustrated in the accompanying drawings.

Figure 3:
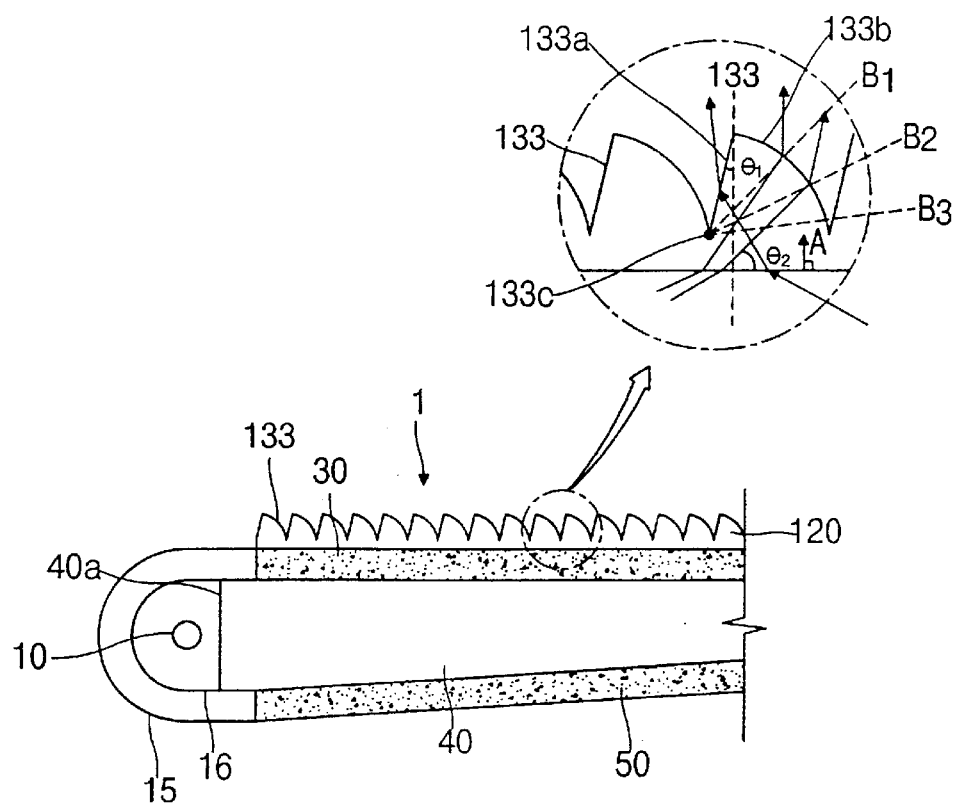
FIG. 3 is a cross sectional view illustrating a configuration of a backlight device according to a preferred embodiment of the present invention.

As shown in FIG. 3, the backlight device 1, according to a preferred embodiment of the present invention, comprises a light source 10, a U-shaped lamp holder 15 having a lamp reflector 16 and a light waveguide plate 40. The light source 10 is located adjacent to an end 40a of the light waveguide plate 40, and most of the light source 10 is surrounded by the lamp holder 15. The end 40a constitutes a surface through which the incident light from the light source 10 is emitted. A reflector 50 is arranged under the light waveguide plate 40, and a diffusing sheet 30 is located on the light waveguide plate 40. On the diffusing sheet 30, is a prism sheet 120 that has a plurality of convex portions 133, having an inclined line portion 133a and a curved line portion 133b. The inclined line portion 133a has an angle θ1, less than 20° with respect to broken line C. Further, it is preferred that the prism sheet 120 is 1.55 and the diffusing sheet 30 is 1 in refractive index.

In the more detailed explanation, when the incident light from the light waveguide plate 40 is directed to the curved line portion 133b of the convex portions 133, the light is greatly refracted and is directed in a vertical direction A. This is because the prism sheet 120 is made of a plastic material, and is greater in refractive index than air. The greater a refraction difference between the prism sheet 120 and the air becomes, the more refracted the light is in a left-hand direction, so that the refracted light is emitted in a vertical direction A. In other words, each point that the transmitted light and the curved line portion 133b contact each other has a normal line and a tangent line. Reference numerals B1, B2 and B3 denote normal lines. The normal lines B1, B2 and B3 are always located at the left side of the incident light so that the refracted light is directed toward a left hand direction with respect to the normal lines B1, B2 and B3. This is because the convex portions 133 has a half circular shape cut and-a central point 133c of the cut half circle 133 is relatively located at its left side. Therefore, as an incident angle θ2 of the light incident to the curved line portion 133b approaches 90°, the refracted light becomes more vertical. When the incident angle θ2 of the incident light is greater than a certain angle, the refracted light is directed more in a left-hand direction than the vertical direction A.

Figure 1:
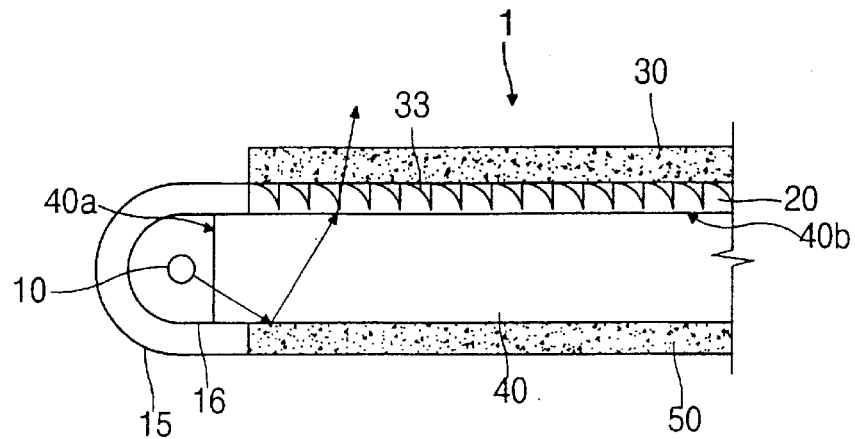
FIG. 1 is a cross sectional view illustrating a backlight device according to the prior art.
Figure 2A:
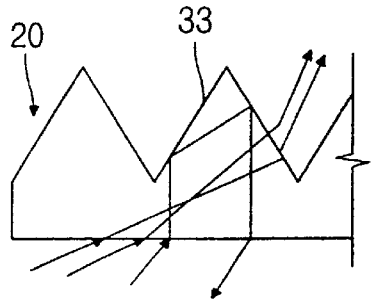
FIGS. 2A to 2C are enlarged views illustrating a prism sheet of the backlight device according to the prior art.
Figure 2B:
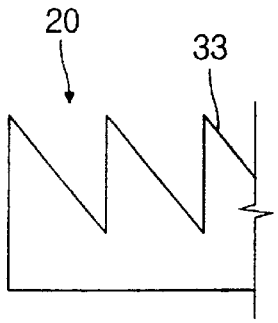
Figure 2C:
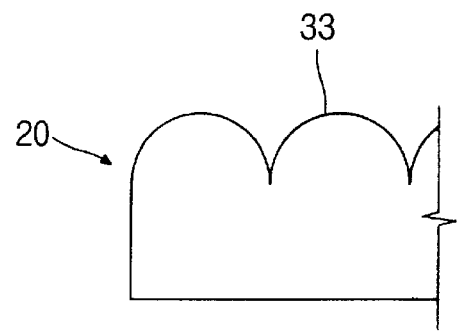

Alternately, when the incident light from the light waveguide plate 40 is directed to the inclined line portion 133a of the convex portions 133 (whose angle θ1 to the center line C is less than 20°), all of the light is refracted upwardly without any reflections, thereby preventing the incident light from being lost, whereas the incident light is directed downwardly due to a total reflection (as in FIGS. 1 and 2).

Figure 6:
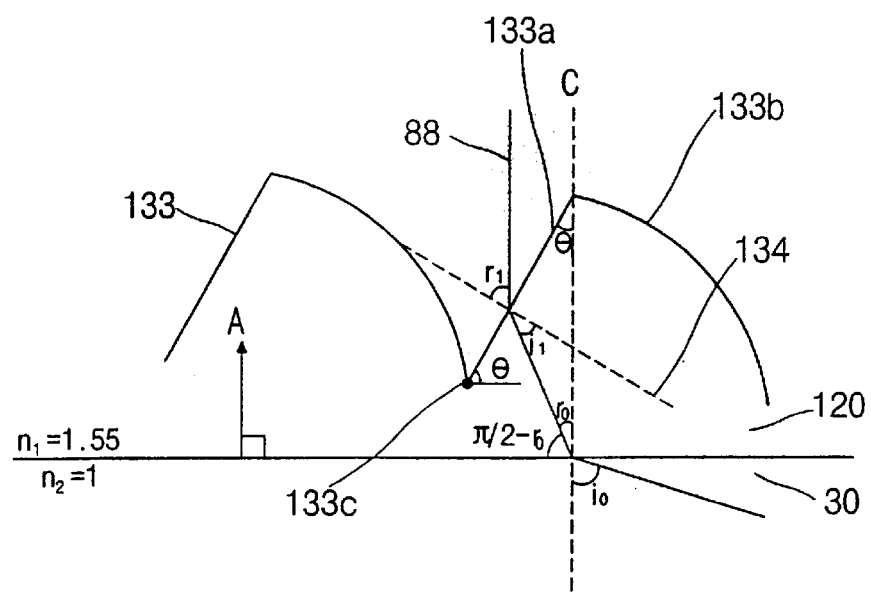
FIG. 6 is an enlarged view illustrating a prism sheet of the backlight device according to the preferred embodiment.

The explanation of why the angle θ1 of the inclined portion 133a should be less than 20° to improve the light efficiency will be provided in detail with reference to FIG. 6. As seen in FIG. 6, the applications formulas $\sin io/1.55 = \sin ro$, $\theta + \pi/2 - ro + \pi/2 - i1 = \pi$, and $r1 - i1 + \pi/2 - ro = \pi/2$ are shown. In the formulas, n1 denotes a refractive index of the prism sheet 120, n2 denotes a refractive index of the diffusing sheet 30, io denotes an incident angle of the light 88 incident to the diffusing sheet 30, ro denotes an angle of the light refracted by the diffusing sheet 30, i1 denotes an incident angle of the light incident to the inclined line portion 133a of the convex portions 133 with respect to a normal line B4, r1 denotes an angle of the light refracted by the inclined portion 133a, and θ denotes an inclined angle of the inclined line portion 133a with respect to the diffusing sheet 30. If it is assumed that the light 88 is directed to the vertical direction A when the angle io is 70°, the angle i1 is 38.7° and the angle θ is 76°. As a result, the angle θ1 is 90°−76°=14°. Namely, the ideal inclined angle θ1 is 14° when a refractive index n1 of the prism sheet 120 is 1.55 and a refractive index n2 of the diffusing sheet 30 is 1. But, the prism sheet 120 having good light efficiency can be obtained so long as the inclined angle θ1 is less than 20°.

Figure 4:
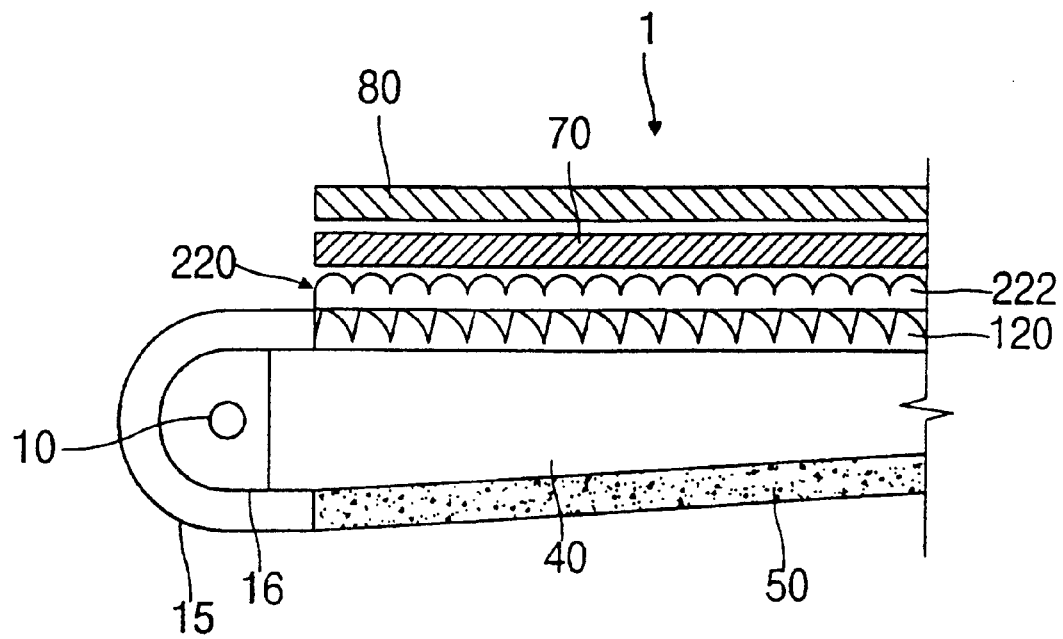
FIG. 4 is a cross sectional view illustrating a modified configuration of a backlight device according to a preferred embodiment of the present invention.

FIG. 4 shows a modified configuration of the backlight device according to the preferred embodiment of the present invention. As shown in FIG. 4, the backlight device 1 has first and second prism sheets 120 and 220. The first prism sheet 120 has an inclined line portion 133a and a curved line portion 133b as seen in FIG. 3. The second prism sheet 220 has a convex portion 222 having a half-circular shape. A quarter wave plate 80, a cholesteric liquid crystal (CLC) polarizer 70, the second prism sheet 220, the first prism sheet 120, and the light wave guide plate 40 are stacked in the above-described order. The CLC polarizer 70 serves to selectively transmit only a circularly polarized light having a set certain wavelength, and the quarter wave plate 80 serves to change a circularly polarized light from the CLC polarizer 70 into a linearly polarized light by changing its phase as much as λ/4.

Figure 5A:
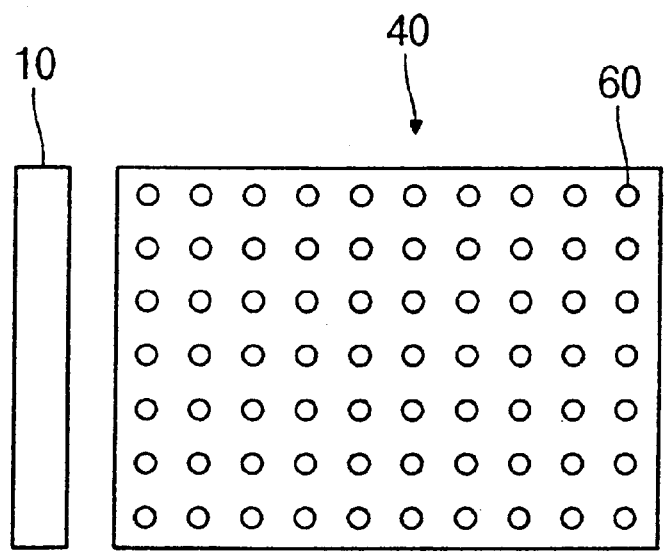
FIGS. 5A and 5B are plan views illustrating a configuration of a light waveguide plate of the backlight device according to the preferred embodiment.
Figure 5B:
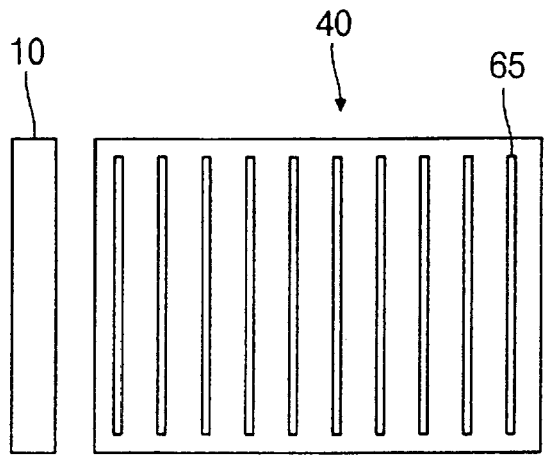

FIGS. 5a and 5b show configuration examples of the light waveguide plate according the preferred embodiment of the present invention. As shown in FIG. 5a, the light waveguide plate 40 has a plurality of convex or concave hole dots 60 to secure a uniform light distribution. As shown in FIG. 5b, the light waveguide plate 40 can have a plurality of V-shaped convex or concave bars 65.

As described hereinbefore, using the backlight device having a prism sheet according to the preferred embodiment of the present invention, the light collecting efficiency and light illumination are much improved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A backlight device for a liquid crystal display device, comprising:
   a light source;
   a light waveguide plate having an end portion and a front portion;
   a lamp holder having a lamp reflector, the lamp holder surrounding most of the light source, the lamp reflector reflecting a light to the end portion of the light waveguide plate; and
   a first prism sheet located on the front portion of the waveguide plate wherein a diffusion sheet is interposed between said first prism sheet and said waveguide plate, the prism sheet having a plurality of convex portions, the convex portions having an inclined line portion with respect to a direction vertical to the front portion of the light waveguide plate, and a curved line portion, the inclined line portion having a predetermined angle with respect to a direction vertical to the front portion of the light waveguide plate, wherein said angle is less than 20° and greater than 0°.

2. The backlight device of claim 1, wherein the light waveguide plate has a plurality of convex hole dots.

3. The backlight device of claim 1, wherein the light waveguide plate has a plurality of concave hole dots.

4. The backlight device of claim 1, wherein the light waveguide plate has a plurality of V-shaped convex bars.

5. The backlight device of claim 1, wherein the light waveguide plate has a plurality of V-shaped concave bars.

6. The backlight device of claim 1, further comprising, a reflector arranged under the light waveguide plate.

7. The backlight device of claim 6, further comprising:
   a second prism sheet having a plurality of convex portions, the second prism sheet arranged on the first prism sheet;
   a cholesteric liquid crystal polarizer arranged on the second prism sheet; and
   a quarter wave plate arranged on the cholesteric liquid crystal polarizer.

8. The backlight device of claim 7, wherein the convex portions of the second prism sheet have a half circular shape.

9. A backlight device for a liquid crystal display device, comprising:
   a light source;
   a light waveguide plate having an end portion and a front portion;
   a lamp holder having a lamp reflector, the lamp holder surrounding most of the light source, the lamp reflector reflecting a light to the end portion of the light waveguide plate; and
   a first prism sheet located on the front portion of the waveguide plate, wherein a diffusion sheet is interposed between said first prism sheet and said waveguide plate the prism sheet having a plurality of convex portions, the convex portions having an inclined line portion and a curved line portion, the inclined line portion having an predetermined angle with respect to a direction vertical to the front portion of the light waveguide plate, wherein said angle is 14°.

10. The backlight device of claim 9, wherein the light waveguide plate has a plurality of convex hole dots.

11. The backlight device of claim 9, wherein the light waveguide plate has a plurality of concave hole dots.

12. The backlight device of claim 9, wherein the light waveguide plate has a plurality of V-shaped convex bars.

13. The backlight device of claim 9, wherein the light waveguide plate has a plurality of V-shaped concave bars.

14. The backlight device of claim 9, further comprising a reflector arranged under the light waveguide plate.

15. The backlight device of claim 14, further comprising:
   a second prism sheet having a plurality of convex portions, the second prism sheet arranged on the first prism sheet;
   a cholesteric liquid crystal polarizer arranged on the second prism sheet; and
   a quartz wave plate arranged on the cholesteric liquid crystal polarizer.

16. The backlight device of claim 15, wherein the convex portions of the second prism sheet have a half circular shape.

* * * * *